Aug. 31, 1965    V. L. ARCHER    3,203,369
DOUGH DROPPER FOR COOKIE MAKING MACHINES
Filed April 18, 1962    3 Sheets-Sheet 1

INVENTOR.
Virgil L. Archer
BY
Popp and Sommer
ATTORNEYS.

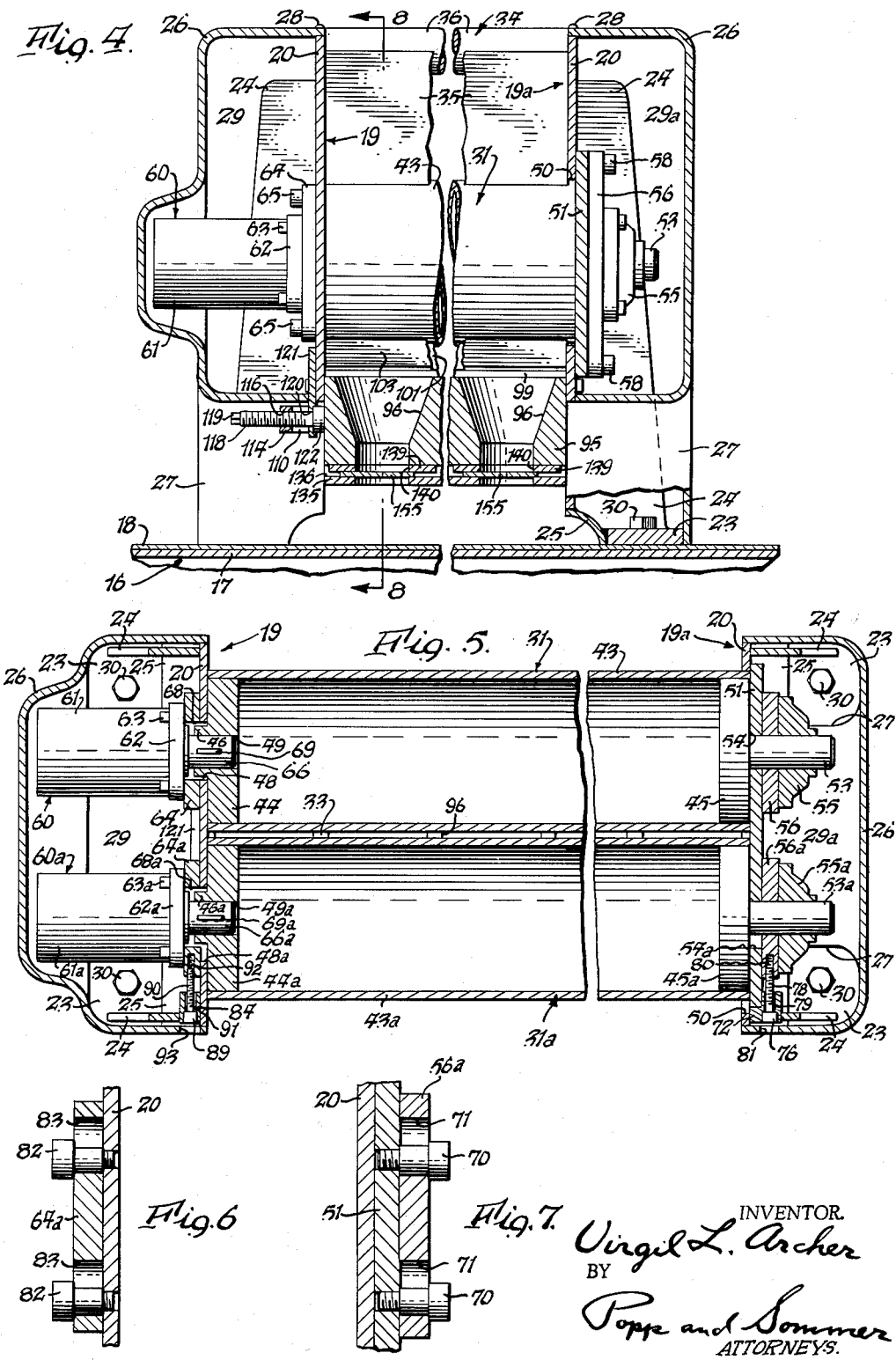

Aug. 31, 1965 V. L. ARCHER 3,203,369
DOUGH DROPPER FOR COOKIE MAKING MACHINES
Filed April 18, 1962 3 Sheets-Sheet 3
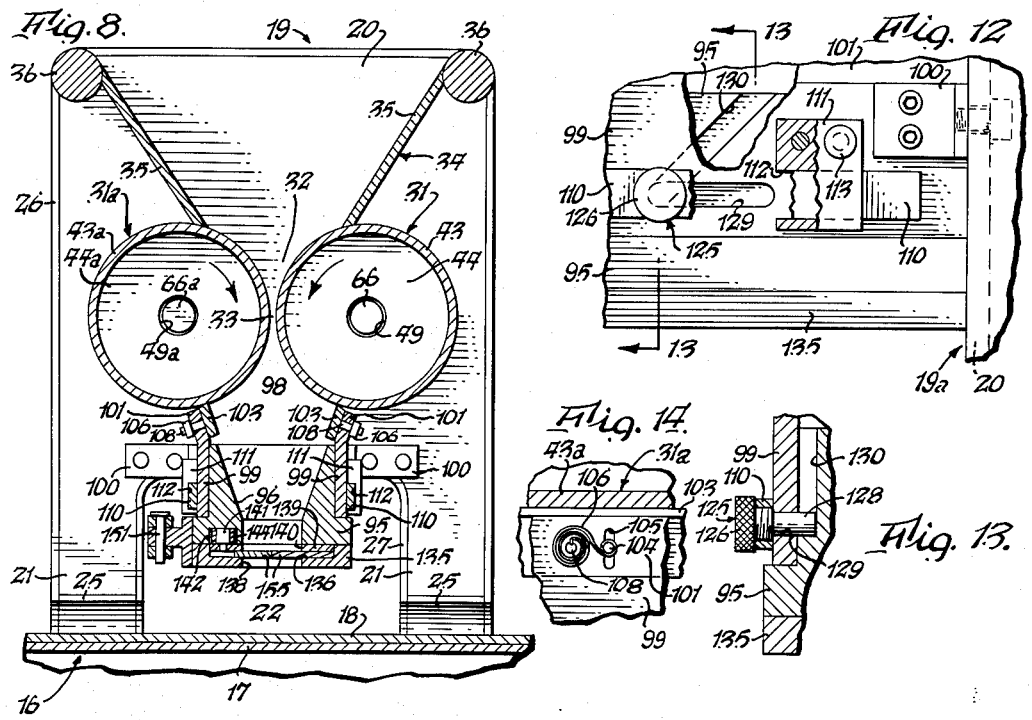

United States Patent Office

3,203,369
Patented Aug. 31, 1965

3,203,369
DOUGH DROPPER FOR COOKIE MAKING
MACHINES
Virgil L. Archer, Cheektowaga, N.Y., assignor to Haut's
Development Co., Inc., Olean, N.Y., a corporation of
New York
Filed Apr. 18, 1962, Ser. No. 188,384
9 Claims. (Cl. 107—29)

This invention relates to a device for simultaneously dropping a row of drops or lumps of dough upon the cookie stations of a moving conveyor, such as a belt, the lumps or drops of cookie dough being subsequently formed into any desired shapes or pattern and then baked.

The present application is particularly related to my copending application for Flour Dropper for Cookie Making Machine, Serial No. 188,418, filed April 18, 1962, and also to the copending application of myself and Robert Challender for Flattening and Dusting Device for Cookie Making Machine, Serial No. 221,768, filed September 6, 1962.

An important object of the present invention is to provide a dough dropper which will handle all forms of cookie dough including very fluid and sticky doughs as well as stiff plastic doughs and also including doughs containing edible solids such as nuts, raisins and the like.

Another important object of the invention is to provide such a cookie dough dropper in which there is minimum mechanical working of the dough in producing the lumps or drops, such mechanical working tending to impair the texture of the cookie by resulting in a heavier and denser cookie and reduced shelf life.

Another object of the invention is to handle dough with a minimum of pressure thereon, high pressure against the dough again tending to impair the texture and quality of the cookie by resulting in a denser and heavier cookie and reduced shelf life.

Another most important object of the present invention is to provide a machine which will simultaneously drop a long row of lumps or drops of cookie dough upon a moving conveyor or the like in which the lumps or drops are all identical as to volume, consistency and shape so as to result in cookies of identical weight, shape and quality when formed and baked.

Another object is to provide such a dough dropper which is rapid in action so that it can be used in conjunction with high speed line production of cookies.

Another important object of the present invention in conjunction with high speed production of cookies of high quality, texture and shelf life is the provision of very large openings through which the dough under pressure is forced and which is rapidly opened and closed over its entire area so that with low pressure large lumps or drops of cookie dough of uniform volume and shape are rapidly formed by the opening and closing of dough openings regardless of the consistency of the dough or presence of edible solids therein.

Another object of the invention is to provide such a cookie dropper in which the timing of the valves to drop lumps of dough of the desired weight and the pressurizing of the dough against these valves can be exactly synchronized with each other and with the movement of the conveyor on which the lumps or drops of cookie dough are dropped to conform to the particular dough being processed.

Another object of the present invention is to provide such a dough dropper which includes a hopper or dough box which can easily be filled with large volumes of dough and in which the subesquent formation of the drops or lumps of cookie dough is a function of the machine itself and does not require careful supervision.

Another object is to provide such a dough dropper which is free from accident hazard, there being no gears or other hazardous drives and the only serious hazard, namely the operation of a pair of dough rollers, being compensated for by providing a spring loaded mounting for one of the dough rollers so that if an operator should get his hands caught between the dough rollers serious injury would not result.

Another object is to provide such a cookie dough dropper which will not be seriously impaired by any foreign objects encountered in the dough and in which the malfunctioning of any one cookies dough dropping valve, as from the presence of such a foreign object, will not impair the proper operation of the other valves.

Another object is to provide such a dough dropper in which the bottom of the dough dropper can easily be adjusted vertically with reference to the belt or conveyer on which the lumps or drops of cookie dough are deposited thereby to permit of having a minimum clearance between the cookie dough dropper and the belt and which can be adjusted to suit the production of different sizes as well as the character of the dough being used.

Another important object of the present invention is to provide such a cookie dough dropper which is easily kept in a clean and sanitary condition and in particular can be washed down and sanitized at the end of each run.

Another important object is to provide such a cookie dough dropper in which there is no escape of the dough except through the valved outlets onto the belt or conveyer so that at all times the machine is free from unslightly outcroppings of dough.

Another object is to provide such a cookie dropper which is trim and attractive in appearance and forms a desirable addition to a bakery.

Another most important object of the invention is to provide such a cookie dropper which is simple and inexpensive in construction and which is free from servicing difficulties as well as not requiring close attention on the part of the operator.

Other objects and advantages of the invention will appear from the following description and drawings in which:

FIG. 4 is a fragmentary vertical section taken generally on line 4—4, FIG. 3.

FIG. 5 is an enlarged fragmentary horizontal section taken generally on line 5—5, FIG. 1.

FIG. 6 is a further enlarged fragmentary horizontal section taken generally on line 6—6, FIG. 2.

FIG. 7 is a further enlarged fragmentary horizontal section taken on line 7—7, FIG. 3.

FIG. 8 is a vertical section taken generally on line 8—8, FIG. 4.

FIG. 9 is a greatly enlarged fragmentary horizontal section taken generally on line 9—9, FIG. 1.

FIGS. 10 and 11 are views generally similar to FIG. 9 and illustrating the action of the shutters of one of the dough valves, these shutters being illustrated in their closed position in FIG. 10 and in their fully opened position in FIG. 11.

FIG. 12 is a greatly enlarged fragmentary view similar to FIG. 1 with parts broken away particularly to disclose certain cam slots used in adjusting the effective height of the array of valves.

FIG. 13 is a fragmentary vertical section taken generally along line 13—13, FIG. 12.

FIG. 14 is a fragmentary enlarged side elevational view similar to FIG. 1 and particularly illustrating the pins and helical springs which bias the doctor blades into engagement with the dough rolls.

Figure 1:
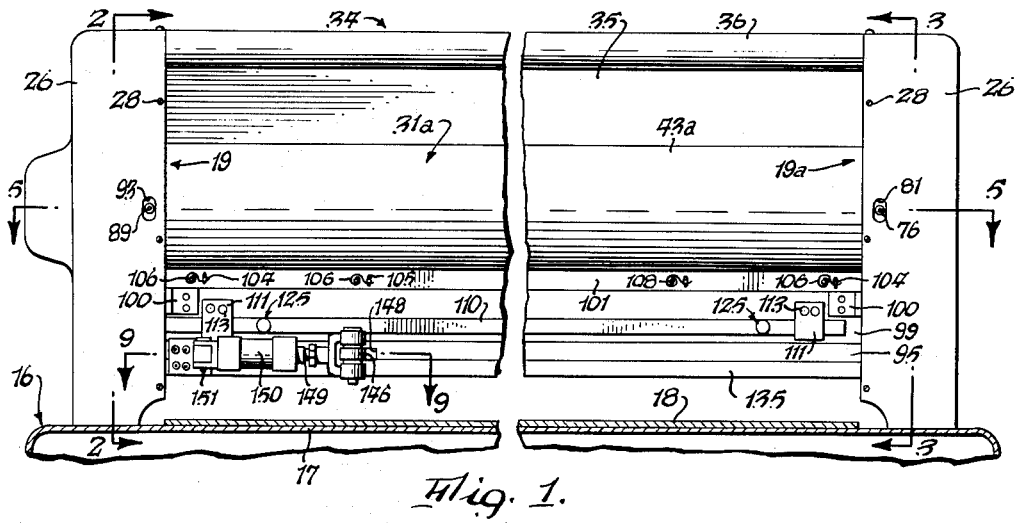
FIG. 1 is a fragmentary side elevational view of a cookie dough dropper embodying the invention and shown as mounted on a table carrying a belt which is bridged by the cookie dropper, the belt and table being shown in section.

The dough dropper forming the subject of the present invention is designed for use in conjunction with a cookie making machine having a base 16 providing a horizontal table top 17 carrying a belt 18 which is bridged by the dough dropper of the present invention and which drops a transverse row of lumps or drops of soft cookie dough upon the belt, these rows being arranged transversely of the belt which is advanced with a step-by-step movement in synchronism with the operation of the dough dropping valves of the dough dropper so that the lumps or drops of dough are dropped on the belt while it is momentarily stationary. A flour dropper as described and claimed in my copending application Serial No. 188,418, filed April 18, 1962 for Flour Dropper for Cookie Making Machine, is arranged both in advance and in rear of the dough dropper forming the subject of the present invention, the one in advance dropping a pad or layer of flour upon the belt at each cookie station before the lump or drop of dough is deposited thereon, and the one in rear flouring the top of each deposited lump or drop of cookie dough preparatory to its being flattened into the desired form of cookie by the Cookie Flattener and Duster describd and claimed in the copending application of myself and Robert M. Challender, Serial No. 221,768, filed September 6, 1962.

The dough dropper embodying the present invention is shown as supported by a pair of end heads 19, 19a mounted on the table top 17 on opposite sides of the belt 18 and in line with each other transversely of the belt. Each end head is shown as being in the form of a vertical plate 20, these plates being arranged parallel with each other and each having spaced legs 21 defining an open space 22 therebetween. Each leg 21 is welded to one edge of a base plate 23 and each vertical plate 20 is braced by a pair of vertical plates or ribs 24 each secured to and projecting diagonally up from each base plate 23 and welded along one edge to the outside face of the corresponding vertical plate 20 to brace the same. Each end head 19, 19a is completed by a pair of quarter round strips of sheet metal 25, the lower edge of each of which is welded to the edge of the base plate 23 facing the belt 18 and the upper edge of which is welded to the bottom edge of the leg 21 of the vertical plate 20 of each end head. Each of these end heads can be enclosed by a readily removablbe cast metal cover 26 having leg portions 27 the bottom edges of which fit around the ends and outer side of each base plate 23 and the upper rim of each of which is shown as fitting around the outside edges of the corresponding vertical plate 20 as well as the inside edge thereof which defines the opening 22. The covers can be removably secured in any suitable manner as by screws 28 and provide an enclosed space 29 around the end head 19 and an enclosed space 29a around the end head 19a. The base plates 23 are shown as secured to the base 16 by bolts 30.

The vertical plates 20 of the end heads 19, 19a journal a pair of cylindrical dough rolls 31 and 31a, these dough rolls being arranged transversely of and above the belt 18 and both dough rolls being arranged in the same horizontal plane and in spaced relation to each other and being simultaneously but intermittently moved so that their opposing faces moves downwardly step-by-step. The function of these dough rolls is to transfer masses of soft cookie dough placed in the valley 32 between the upper parts of these dough rolls downwardly through the nip or bite 33 between these rolls and to bring this dough into pressure contact with a row of dough valves in the floor or bottom of a dough chamber provided below these rolls. To facilitate feeding dough to the valley 32 between the dough rolls 31, 31a, a hopper 34 is provided thereabove by a pair of inclined side walls or plates 35 having their upper edges strengthened by round rods 36 welded thereto with the vertical ends of these plates and rods suitably secured to the opposing faces of the vertical plates 20 of the end heads 19, 19a, the bottom edges of these side plates being close to the crests of the peripheries of the dough rolls 31, 31a.

The dough roll 31 is journalled to rotate about a fixed axis and for this purpose comprises a metal cylinder 43 having circular end heads 44 and 45 inserted and fixed in its opposite ends, the end head 44 being provided with a hub 46 projecting through an over-sized opening 48 in the vertical plate 20 of the end head 19 and this end head 44 also having an axial through opening 49.

The opposite ends of the dough rolls 31 and 31a project into a large opening 50 in the plate 20 of the end head 19a and this opening is covered by a large generally rectangular plate 51 having its rim arranged against the inside face of the vertical plate 20 of the end head 19a and secured thereto as by screws 52. The circular end head 45 is provided with an integral shaft or hub 53 which projects through an opening 54 in this plate 51 and is journalled in a bearing 55 mounted on a plate 56, the latter being secured, as by screws 58, to the inside face of the plate 51 as best shown in FIG. 3.

Figures 2, 3:
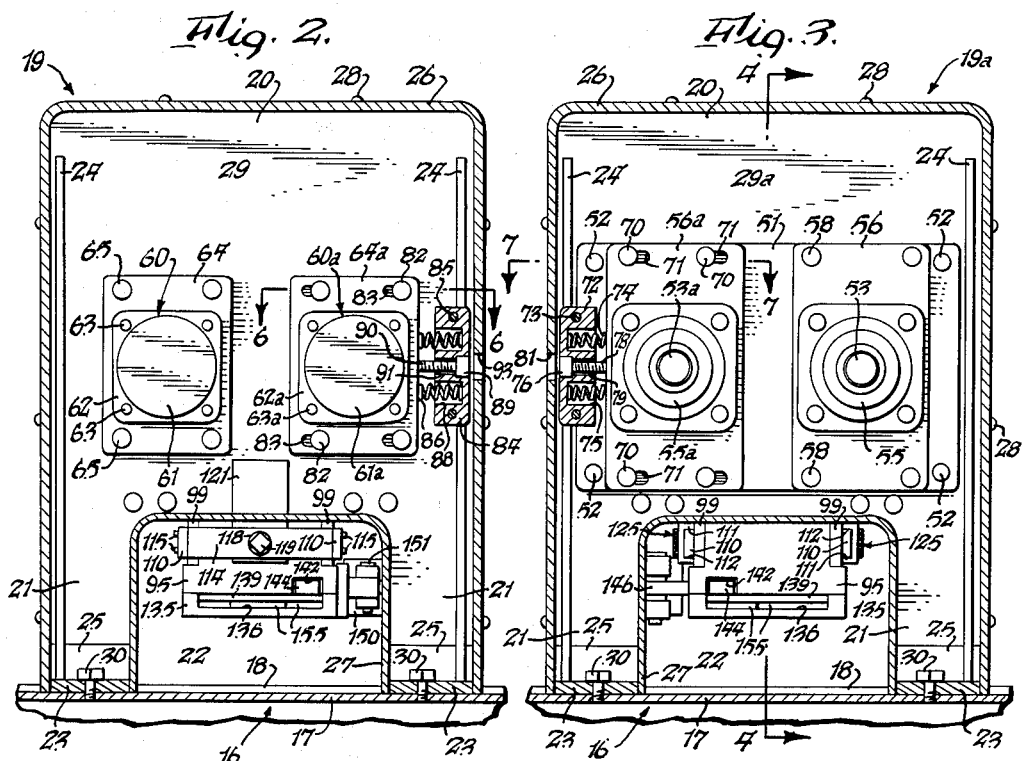
FIGS. 2 and 3 are enlarged vertical sections taken on the correspondingly numbered lines of FIG. 1.

The end of the dough roll 31 containing the end head 44 is supported and driven by a hydraulic motor indicated generally at 60 and shown as having a cylindrical housing 61 concentric with the dough roll 31 and as having an outwardly flanged end head 62 at one end secured, as by screws 63, to a rectangular plate 64 the latter being in turn secured, as by screws 65, to the inside face of the vertical plate 20 of the end head 19 as best shown in FIG. 2. This hydraulic motor 60 is of conventional construction available on the open market and preferably is of the type described in detail in the Charlson Patent 2,821,171, dated January 28, 1958 now Reissue No. 25,291 dated December 4, 1962. The concentric output shaft 66 extends through an opening 68 in the plate 64 and into the bore 49 of the dough roll end head 44. This output shaft 66 can be keyed to this dough roll end head as indicated at 69.

The other dough roll 31a is constructed, mounted and driven in much the same manner as the dough roll 31, the essential difference between the two rolls being that the dough roll 31a is mounted for movement horizontally toward and from the other dough roll and also to permit these rolls to spring apart should an operator get his hands caught between the rolls.

To this end the parts of the dough roll 31a are identical will the dough roll 31 and the same reference numerals have therefore been employed and distinguished by the suffix "a." However, the hub 53a, on circular end head 45a projects through a horizontal slot 54a so that this hub is capable of transverse movement horizontally relative to the plate 51. This hub 53a is journalled in a bearing 55a mounted on a plate 56a but this plate has a spring loaded adjustable mounting on the plate. Thus the mounting screws 70 for this plate 56a extend through slots 71 in this plate and are constructed to slidingly mount this plate 56a so that it can slide horizontally along its slots 71.

A metal block 72 in the chamber 29a is arranged in line with the axis of the dough rolls 31, 31a on the side of the dough roll 31a remote from the dough roll 31 and is secured, as by screws 73, to the edge of the plate 51. A pair of helical compression springs 74 arranged in bores 75, are interposed between the block 72 and the near edge of the plate 56a to urge this plate and the corresponding end of its dough roll 31a horizontally toward the other dough roll 31 but this movement is limited by the head 76 of a horizontal stop screw 78 which slidingly extends through an unthreaded bore 79 through the block 72 and is anchored in a threaded bore 80 in the edge of the plate 56a. It will be seen that screwing or unscrewing the screw 78, through an access opening 81 in the cover 26 for the end head 19a, permits the springs 74 to move the plate 56a and end of the dough roll 31a journalled thereon to the required spacing from the dough roll 31 and also that if the operator should get his hand caught between the dough rolls the springs 74 permit these dough rolls to separate.

The hub 46a at the opposite end of the dough roll 31 extends through a horizontal slot 48a in the plate 20 of the end head 19 so that this hub is capable of transverse movement horizontally relative to this plate 20. This hub 46a and its end head 44a are supported and driven by a hydraulic motor indicated generally at 60a and shown as having a cylindrical housing 61a concentric with the dough roll 31a and as having an outwardly flanged end head 62a at one end secured, as by screws 63a, to a plate 64a. The construction of the hydraulic motor 60a is the same as that of the hydraulic motor 60, namely, preferably in accordance with the Charlson Patent 2,821,171, now Reissue 25,291, dated December 4, 1962. However, this plate 64a has a spring loaded adjustable mounting on the plate 20. To this end the mounting screws 82 for this plate 64a extend through slots 83 in this plate and are constructed to slightly mount this plate so that it can slide horizontally along its slots 83.

A metal block 84 in the chamber 29 is arranged in line with the axes of the dough rolls 31, 31a on the dough roll 31 and is secured, as by screws 85, to the edge of the plate 20. A pair of helical compression springs 86, arranged in bores 88, are interposed between the block 84 and the near edge of the plate 64a to urge this plate and the corresponding end of its dough roll 31a horizontally toward the other dough roll but this movement is limited by the head 89 of a horizontal stop screws 90 which slidingly extends through an unthreaded bore 91 through the block 84 and is anchored in a threaded bore 92 in the edge of the plate 64a. It will be seen that screwing or unscrewing the screw 90, through an access opening 93 in the cover 26 for the end head 19, permits the springs 86 to move the plate 64a and end of the dough roll 31a journalled thereon to the required spacing from the dough roll 31 and also that if the operator should get his hand caught between the dough rolls, the springs 86 permit these dough rolls to separate.

The valve mechanism for depositing drops or lumps of dough on the cookie stations on the belt 18 is preferably constructed as follows:

The numeral 95 designates a large rectangular casting having a row of downwardly diminishing conical bores 96 extending vertically therethrough, this casting forming the floor member or the bottom of the dough chamber 98 in which the dough is pressurized by the dough rolls 31, 31a. This casting has its vertical end faces abutting the vertical removable plates 20 of the end heads 19 and 19a as best shown in FIG. 4, these plates forming the end walls of this dough chamber 98. The side walls of this dough chamber are formed by side plates 99 secured at their ends, by means of angle brackets 100, to the vertical end head plates 20 which they abut. These side plates 99 contact the longitudinal outside vertical faces of the floor member or casting 95 and project upwardly therefrom, the upwardly projecting parts 101 of these side plates preferably diverging upwardly away from each other as best shown in FIG. 8.

Each of these side plates 99 carries a doctor blade or scraper 103 arranged against the inside face of its upwardly projecting part 101 and having its upper edge in contact with the underside of the companion dough roller 31 or 31a to prevent the escape of pressurized dough from the dough chamber 98 along the undersides of the dough rollers. Preferably these doctor blades 103 are spring-loaded and for this purpose each is provided with a plurality of transverse pins or studs 104 projecting outwardly through vertical slots 105 provided in the upwardly projecting parts 101 of the side plates 99. Each of these pins is engaged by the free end of a spring 106 shown as being of spiral form with the center of its spiral anchored in a pin or adjusting screw 108 projecting outwardly from the side plate 99 adjacent each pin 104. The entire floor member or casting 95 is vertically adjustable with reference to its side plates 99 to adapt the machine to dropping larger lumps or drops of dough in making larger cookies or to adapt it to doughs of different consistencies. For this purpose the mounting for the casting 95 is preferably constructed as follows:

The numeral 110 designates a horizontal longitudinally sliding bar arranged lengthwise of each side wall 99 against the exterior face thereof. Each of these bars is slidingly supported at its opposite ends in blocks or brackets 111 each having a horizontal slideway or channel 112 which slidingly supports the bar 110 and maintains it in contact with the exterior face of the side wall 99. These guide blocks or brackets 111 can be secured in any suitable manner as by screws 113. At the end head 19 the ends of these bars project into the space 22 through this end head and are cross-connected by a cross bar 114 which can be secured thereto by screws 115 or in any other suitable manner. This cross bar 114 is centrally provided with a transverse horizontally threaded opening 116 in which an adjusting screw 118 works, this adjusting screw having a square end 119 to which a wrench can be applied for this purpose. The opposite end of this screw extends through an unthreaded opening 120 provided in a plate or bracket 121 secured to and projecting downwardly from the center of the vertical plate 20 of the end head 19. This screw 118 is provided with a head 122 arranged between the bracket 121 and the casting 95. Since this head holds the screw 118 against longitudinal movement it will be seen that turning this screw draws the cross bar 114 to move the slide bars 110 longitudinally.

For the purpose of translating this sliding movement of the bars 110 into vertical movement of the floor member or casting 95, a transverse horizontal pin 125 is mounted at each end of each slide bar 110, these pins preferably being in the form of screws having large exterior heads 126 which permit their ready removal, the stems or studs 128 of these pins being the effective portions thereof and severally projecting horizontally inwardly from the ends of the slide bars 110 into horizontal slots 129 provided through the side walls 99 of the dough chamber 98. The stud 128 of each pin projects beyond the horizontal slots 129 into diagonal slots 130 provided in the vertical side faces of the casting 95. These diagonal slots are all arranged at the same angle, this being shown as being approximately 45° with reference to the horizontal, the slots 129 being horizontal. The studs 128 of the pins 125 provide the sole support for the casting 95 and it will be seen that when these studs are moved horizontally with their slide bars 110, these studs ride along the slot 129 and 130 of the fixed side plates 99 and vertically movable casting 95 respectively. Since these slots are arranged at a vertical angle to each other, this movement is translated into a vertical movement of the casting 95 with reference to these side plates.

The dough dropper of the present invention is completed by a valve mechanism which insures the discharge of equal amounts of dough from the bottoms of the conical bores 96, this valve mechanism being preferably constructed as follows:

The numeral 135 designates a bottom plate secured to the underside of the casting 95 in any suitable manner, this bottom plate being channel-shaped in cross section with its channel opening upwardly to form a broad flat horizontal valve chamber 136 between the floor member 95 and the bottom plate 135. This plate has a row of openings 138 therethrough which conform to and are in register with the lower open ends of the conical bores 96. Within the valve chamber 136 formed by channel 135 are arranged a series of circular plates or rings 139 each of which is associated with a corresponding conical bore 96 and has a central opening 140 conforming to and in register therewith. These circular plates or rings 139 are simultaneously turned about their axis and for this purpose each circular plate is provided at one longitudinal side of the casting with a vertical pin 141 which projects upwardly therefrom into a horizontal longitudinal slideway 142 provided in the underside of the casting 95. Each of these pins projects upwardly into a longitudinal slot 143 in a slide bar 144 which slides longitudinally in this slideway 142. Preferably each pin 141 is urged toward one end of its slot 143 by a small helical compression spring 145 contained in the balance of the slot 143, these springs providing individual spring loading for the several dough valves. Thus, if any dough valve associated with any one of the conical bores 96 should become clogged, its spring 145 will yield and not interfere with the proper operation of the other dough valves. The slide bar 144 has an operating arm 146 projecting horizontally outwardly therefrom through a slot 148 in the floor member or casting 95 and to the outboard end of this operating arm 146 is pivotally secured the piston rod 149 of a piston contained within a horizontal cylinder 150, which is pivotally secured at one end, as indicated at 151, to the casting 95.

Each circular plate 139 is guided to rotate about its axis by a plurality of valve shutter plates 155 which it actuates to bring them into edge engagement with one another and form the closure means for each conical bore 96. The valve shutter plates 155 for each valve are shown as being three in number in face-to-face relation with the corresponding circular plates 139 and each is provided with a straight end edge 156 and a straight side edge 158 which meets its end edge at an included angle of 120° so that these valve shutter plates can be brought together in the manner illustrated in FIG. 11 and form a complete closure for the conical bores 96, each end edge 156 being in contact with the side edge 158 of the next succeeding valve shutter plate. For this purpose each valve shutter plate 155 has a tail portion 159 remote from its end edge 156 and this tail portion is secured by a vertical pivot pin 160 to the underside of the companion circular plate or ring 139, these pivot pins 160 being equally spaced around the periphery of each ring 139. Each valve shutter plate 155 is also provided with a pin or stud 161 projecting downwardly therefrom. Each one of these pins works in an arcuate slot 162 formed in the upper side of the bottom plate 135. The orientation of these slots 162 is important to the proper operation of the valve, those slots being in spiral relation to the dough openings 96, 138 and 140 and also having their concave sides facing the companion pivot pins 160.

*Operation*

In the operation of the cookie making machine, the belt 18 on the table 17 is advanced step-by-step so as to progressively bring a transverse row of cookie stations thereon under the dough dropper of the present invention. In synchronism with this step by step movement of the belt each of the hydraulic motors 60, 60a is actuated to advance simultaneously the dough rollers 31, 31a a partial rotation. The degree and speed of such partial rotation of these hydraulic motors 60, 60a can be adjusted, the drive from the hydraulic motors being through their output shafts 66, 66a and keys 69, 69a directly to the corresponding end heads 44, 44a of the dough rollers 31, 31a.

This step-by-step rotation of these dough rollers 31, 31a is such that their opposing surfaces move downwardly and so that masses of dough placed in the hopper 34 above these dough rollers is drawn downwardly in the valley 32 between the upper parts of these dough rollers and squeezes through the bite or nip 33 between these dough rollers and forced under pressure into the dough chamber 98 below these dough rollers, the bottom of which is formed by the casting or floor member 95 which carries the valve mechanism for simultaneously dropping a row of separate equal quantities of dough across the belt 18 on its cookie stations while the belt is temporarily halted. The pressurized dough in the dough chamber 98 is prevented from escaping from the sides of this chamber by the side walls 99 thereof and by the spring loaded doctor blades or scrapers 103 carried by these walls, these doctor blades or scrapers being urged into engagement with the undersides of the dough rollers 31, 31a by the spiral springs 106 anchored on the side plates 99 of the dough chamber 98 and having their free or tail ends engaging the undersides of pins 104 projecting outwardly from the doctor blades 103 through vertical slots 105 in the side walls 99.

Each time the belt 18 comes to a stop in its step-by-step movement, the cylinder 150 is hydraulically pressurized by means (not shown) operatively associated with the drive for the step-by-step belt 18 and also operatively associated with the cylinder 150 whereby the belt 18 is advanced with a step-by-step movement in synchronism with the operation of the dough dropping valves so that the lumps or drops of dough are dropped on the belt 18 while it is momentarily stationary. Thus, this pressurization of the cylinder 150 is effective to extend its piston rod 149 and through the arm 146 move the slide bar 144 longitudinally along its slideway 142 in the underside of the casting 95. This pushes the pins 141 projecting upwardly from the several circular plates or rings 139 so as to apply a tangential force to each of these plates. Each of these circular plates 139 is constrained to rotate about its veritcal axis by virtue of the pivot pins 160 projecting downwardly from these plates into the tail ends 159 of the several valve shutter plates 155 and by virtue of the pins 161 projecting downwardly from each of these valve shutter plates into the arcuate slots 162 in the top face of the bottom plate 135 for the casting 95.

This circular movement of the circular plates or rings 139 is counterclockwise as viewed in FIG. 9 and this counterclockwise movement causes its pins 160 to move away from the outboard ends of the slots 162, that is, from the position shown in FIG. 10 to the position shown in FIG. 11. This draws upon the pin 161 fixed to each of these valve shutter plates and causes these pins to move from the inboard ends of the arcuate slots 162, as shown in FIG. 10, to the outboard ends of these slots, as shown in FIG. 11. This movement of these valve shutter pins 161 to the outboard ends of the slots 162 causes these valve shutter plates to swing rapidly away from each other about the axes of their moving pins 160, 161 disengaging their edges 156, 158 and to a position completely clearing the openings 138 and 140 in the bottom plate 135 and circular plates 139.

Accordingly, the pressurized dough contained in the dough chamber 98 is forced downwardlly through each of the conical bores 96 and past the now open valve shutter plates 155 and through the openings 138 and 140 in the bottom plate 135 and circular discs or rings 139, respectively, to be deposited as a row of drops or lumps across the belt 18.

The size of these lumps or drops is determined by the closing of the valve shutters 155, that is, by the time they are left open. This closing is effected by introducing fluid pressure into the cylinder 150 to withdraw its piston rod 149. Through its lateral arm 146, this draws the slide bar 144 to the left as viewed in FIG. 9 along its guide slot 142 in the underside of the casting 95. This movement is transmitted through the helical compression springs 145 against the pins 141 of the several circular discs or rings 139 and since these circular plates or rings are constrained to move around their axes, this effects a clockwise partial rotation of these circular plates as viewed in FIG. 9. Accordingly, the pins 160 of these discs are also moved clockwise thereby to push the tail ends of the several valve shutter plates 155 toward the outboard ends of the arcuate slots 162 in the underside of the casting or floor member 95. This causes the pin 161 of each valve shutter plate 155 to travel rapidly toward the inboard ends of these slots 162 until each end edge 156 of each shutter plate engages the side edge 158 of the next succeeding valve shutter plate 155, the meeting of these edges cutting off the escape of dough to provide lumps or drops of the exact size required. In this position the shutter plates 155 bridge and completely close the openings formed by the conical bores 96. If any of the valve shutter plates 155 should become stuck or if some foreign object in the dough should prevent the closing of any of these valve shutter plates, the helical compression spring 145 associated with this particular shutter plate will merely be compressed to a greater extent and the proper functioning of all of the other groups of valve shutter plates will not be affected. When an imperfect line of cookies is noted by the operator, the machine can be stopped to correct the dinfficulty so encountered by the single valve shutter plate.

With larger lumps of dough required for the production of large cookies, especially if the dough is quite fluid and sticky, it is desirable to raise the entire bottom part of the cookie dropper to provide increased clearance between it and the belt 18. To do this, all that is required is to turn the screw 118 by means of a wrench. This screw is held against longitudinal movement by its head 122 and hence, through the cross bar 114 in which it is threaded, this moves the slide bars 110 connected with the ends of this cross bar. These slide bars 110 are guided by the blocks 111 for movement horizontally lengthwise along the exterior side face of the side plates 99 and have horizontal studs 128 projecting inwardly through horizontal slots 129 in the side plates 99 and upwardly inclined slots 130 in the vertical side faces of the casting 95. By virtue of the relative angularity of the slots 129 and 130, this movement of these studs 128 along both groups of slots results in a vertical movement of the floor member casting 95, this casting being guided between the side plates 99 and end plates 20. Since this casting 95 carries the entire array of valve mechanisms and also the bottom plate 135, this adjustment moves the entire bottom part of the cookie dropper vertically with reference to the belt 18 to provide any required clearance for any particular type of cookies being formed.

It will be seen that the present cookie dough dropper operating as above described achieves the many important objectives and has the many advantages previously set forth, particularly in rapid formation of a long row of lumps or drops of cookie dough or drops of cookie dough regardless of the fluidity or stickiness or edible solids contained within the dough and in the production of cookies having uniformity in shape and weight as well as having a high quality light texture, as well as long shelf life. Thus, the pressure in the dough pressure chamber 98 is produced wholly by the descending opposing faces of the dough rollers 31, 31a so that this dough pressure only reaches a low value, which is subject to regulation, however, depending upon the degree of stiffness or solidity of the dough employed. Further, since these dough rollers are rotated in a step-by-step action, the dough pressure can be synchronised with the opening of the valves so that further minimizing of the pressure on the dough can be attained, that is, a pressure is not required against closed valves other than to fill the dough chamber completely and the greater part of the pressure is utilized essentially to move the dough through the large open valve openings. It has been found that high pressures against the dough are undesirable both in reducing the size and increasing the density and resulting in a cookie having a denser and coarser texture, and also reducing the shelf life of a cookie. Also, it has been found that such coarser texture, and heavier and smaller cookies and reduced shelf life also results from unnecessary mechanical working of the cookie dough and it will be seen that the present invention is particularly free from excessive mechanical working, the only material mechanical working begin when the dough passes through the bite or nip of the dough rollers 31, 31a, the valve being not only practically instantaneous in action, but also having very large through openings which are wholly unobstructed and through which the lumps of dough are instantaneously projected and cut off with a minimum of working upon the dough.

It will also be seen that by the use of these very large openings in the dough valves and the valve shutter plates 155 which instantly make the full area of these openings either open or closed, the present dough dropper is adapted to the high speed production of cookies since the drops or lumps of dough are instantly formed and permitted to fall upon the conveyer belt 18 immediately under the machine.

It will also be seen that the cookie dough dropper does not tend to extrude entirely outcroppings of dough and is easily washed and kept in a sanitary condition and can easily be filled with dough in the continuous line production of cookies.

It will also be noted that there are no serious hazards to the operator, there being no hazardous gears or chains and the only serious hazard, namely the possibility of the operator getting his hand caught between the dough rollers 31, 31a being obviated by making one of these rollers spring loaded.

It will also be seen that the spring loading of the valve shutter plates 155 not only avoids the very remote possibility of injury to one's fingers, but also avoids danger of injury to the valve if the shutter plates should encounter some foreign object in the dough or possibly if they should close because of too large an edible solid being caught.

It will also be noted that the entire effective height of the dough dropper with reference to the belt 18 can be easily adjusted to suit the production of cookies of different sizes from different types of dough.

What is claimed is:

1. In a cookie making machine having a step-by-step conveyer and a progression of transverse rows of cookie stations thereon; the combination therewith of a cookie dough dropper adapted to deposit separate drops of cookie dough simultaneously on the cookie stations of each row, comprising means forming a dough chamber arranged transversely above said conveyer in vertically spaced relation thereto and having a row of openings through its bottom arranged to register with said cookie stations on said conveyer, means adapted to pressurize the dough in said dough chamber, a channel-shaped bottom plate secured to the underside of said bottom and forming a broad flat horizontal valve chamber therebetween, said bottom plate having openings in register with said openings in said bottom, a rotatable ring open at its center in said valve chamber concentric with each pair of said openings, a plurality of horizontal flat shutter plates arranged in the same horizontal plane in said valve chamber in face-to-face relation with each ring and having edges adapted to be brought into edge-to-edge mating relation with one another to bridge and close the corresponding pair of openings, a vertical pivot pin on each shutter plate pivotally connecting it with said ring, means moving each group of said shutter plates into and out of edge-to-edge mating relation with one another in response to rotation of the ring associated therewith, and means for rapidly and simultaneously rotating said rings to simultaneously open and close said shutter plates and thereby cut off pieces of dough descending through said pairs of openings in response to the pressure of said dough in said dough chamber.

2. The combination set forth in claim 1 wherein said means simultaneously rotating said rings comprises a horizontal slide bar extending lengthwise of said row of openings generally tangentially to said rings, means pivotally connecting each ring to said slide bar and means moving said slide bar longitudinally.

3. The combination set forth in claim 1 wherein said means simultaneously rotating said rings, comprises a horizontal slide bar extending lengthwise of said row of openings generally tangentially to said rings, a vertical pin on each ring in line with said slide bar and a spring interposed between each of said last mentioned pins and said slide bar and through which motion from said slide bar is transmitted in closing said shutter plates.

4. In a cookie making machine having a base carrying a step-by-step conveyer and a progression of transverse rows of cookie stations thereon; the combination therewith of a cookie dough dropper adapted to deposit separate drops of cookie dough simultaneously on the cookie stations of each row; comprising end heads rising from said support at opposite sides of said conveyer and with which said rows of cookie sations come progressively into alinement, laterally spaced vertical side plates secured at their ends to said end heads and bridging the space therebetween to define a dough chamber, a floor member in the form of a block having longitudinal side faces engaging the opposing faces of said side plates and enclosing the bottom of said dough chamber and having a row of vertical through openings spaced to register with said cookie stations on said conveyer, means securing said floor member to said side plates, comprising a slot at each end of each side plate and running longitudinally thereof and extending transversely through each side plate, a slot in each side of said floor block in register with a companion slot in a side plate, one of said companion pair of slots being arranged at a vertical angle to the other, a pin jointly contained in each companion pair of slots, and means simultaneously moving said pins generally horizontally in the same direction to move all four corners of said block up or down with reference to said side plates, means adapted to pressurize the dough in said dough chamber, a valve associated with each through opening and having closure means movable from a position bridging each opening to a position uncovering said opening and means simultaneously opening and closing said closure means for all of said openings to simultaneously force dough through all of said openings in response to the pressure of said dough in said dough chamber.

5. The combination set forth in claim 4 wherein said means simultaneously moving said pins generally horiziontally in the same direction comprises a generally horizontal slide bar along the exterior vertical side of each side plate and connected to a corresponding pin, means connecting said slide bars together adjacent one end head, and screw means interposed between said connecting means and said adjacent end head to adjust the longitudinal position of said slide bars.

6. In a cookie making machine having a base carrying a step-by-step conveyer and a progression of transverse rows of cookie stations thereon; the combination therewith of a cookie dropper adapted to deposit separate drops of cookie dough simultaneously on the cookie stations of each row, comprising end heads rising from said support at opposite sides of said conveyer and with which said rows of cookie stations come progressively into alinement, laterally spaced vertical side plates secured at their ends to said end heads and bridging the space therebetween to define a dough chamber, a floor member enclosing the bottom of said dough chamber and having a row of vertical through openings spaced to register with said cookie stations on said conveyer, means securing said floor member to said side plates, means adapted to pressurize the dough in said dough chamber comprising a pair of parallel closely spaced dough rolls arranged with the lower parts of their peripheries parallel with and adjacent to the upper edges of said side plates and arranged with their ends close to said end heads, means journalling said dough rolls in said end heads, sealing means between said upper edges of said side plates and said peripheries of said dough rolls, motor means rotating said dough rolls step-by-step in unison to move their opposing faces downwardly to carry dough placed in the valley between said dough rolls downwardly through the nip therebetween and to pressurize the body of dough between the dough rolls, a valve associated with each through opening and having closure means movable from a position bridging each opening to a position uncovering each opening, and means simultaneously opening and closing said closure means for all of said through openings to simultaneously force dough through all of said openings in response to the pressure of said dough in said dough chamber.

7. In a cookie making machine having a base carrying a step-by-step conveyer and a progression of transverse rows of cookie stations thereon; the combination therewith of a cookie dropper adapted to deposit separate drops of cookie dough simultaneously on the cookie stations of each row, comprising end heads rising from said support at opposite sides of said conveyer and with which said rows of cookie stations come progressively into alinement, laterally spaced vertically side plates secured at their ends to said end heads and bridging the space therebetween to define a dough chamber, a floor member enclosing the bottom of said dough chamber and having a row of vertical through openings spaced to register with said cookie stations on said conveyer, means securing said floor member to said side plates, means adapted to pressurize the dough in said dough chamber comprising a pair of parallel closely spaced dough rolls arranged with the lower parts of their peripheries parallel with and adjacent to the upper edges of said side plates and arranged with their ends close to said end heads, means journalling said dough rolls in said end heads, sealing means between said upper edges of said side plates and said peripheries of said dough rolls, a hydraulic motor mounted on an end head with its output shaft concentric with a companion dough roll, means operatively connecting each dough roll with its output shaft to move the opposing faces of said dough rolls downwardly to carry dough placed in the valley between the dough rolls downwardly through the nip therebetween and to pressurize the body of dough below the dough rolls, a valve associated with each through opening and having closure means movable from a position bridging each opening to a position uncovering each opening, and means simultaneously opening and closing said closure means for all of said through openings to simultaneously force dough through all of said openings in response to the pressure of said dough in said dough chamber.

8. In a cookie machine having a step-by-step conveyer and a progression of transverse rows of cookie stations thereon; the combination therewith of a cookie dough dropper adapted to deposit separate drops of cookie dough simultaneously on the cookie stations of each row, comprising means forming a dough chamber arranged transversely above asid conveyer in vertically spaced relation thereto and having a row of openings through its bottom arranged to register with said cookie stations on said conveyer, means adapted to pressurize the dough in said chamber, a valve associated with each opening and having a plurality of horizontal flat shutter plates arranged in the same horizontal plane and having edges adapted to be brought into edge-to-edge mating relation with one another to bridge and close said openings, a pivot pin on each shutter plate projecting into an arcuate slot in said bottom, each group of said slots being in spiral relation to their said opening, and means rapidly and simultaneously swinging all of said shutter plates about their pivot pins and to move their pivot pins along their arcuate slots in guiding said shutters to bring their edges into and out of edge-to-edge mating relation with one another to cut off pieces of dough from the dough forced down through all of said openings in response to the pressure of the dough in said dough chamber.

9. In a cookie making machine having a step-by-step conveyer and a progression of transverse rows of cookie stations thereon; the combination therewith of a cookie dough dropper adapted to deposit separate drops of cookie dough simultaneously on the cookie stations of each row, comprising means forming a dough chamber arranged transversely above said conveyer in vertically spaced relation thereto and having a row of openings through its bottom arranged to register with said cookie stations on said conveyer, means adapted to pressurize the dough in said chamber, a valve associated with each opening and having a plurality of horizontal flat shutter plates arranged in the same horizontal plane and pivoted to swing about vertical axes into and out of edge-to-edge mating relation with one another in which edge-to-edge mating relation they bridge and close said openings, and means rapidly and simultaneously swinging all of said shutter plates to and from said edge-to-edge mating relation with one another to cut off pieces of dough from the dough forced down through all of said openings in response to pressure of the dough in said dough chamber.

References Cited by the Examiner
UNITED STATES PATENTS

| | | | |
|---|---|---|---|
| 551,714 | 12/95 | Bromley | 107—12 |
| 740,582 | 10/03 | Meikleham | 107—29 |
| 820,386 | 5/06 | Bryce | 107—29 |
| 2,228,531 | 1/41 | Newman | 107—28 |
| 2,793,598 | 5/57 | Rivoche | 107—14 |

WALTER A. SCHEEL, *Primary Examiner.*

CHARLES A. WILLMUTH, ROBERT E. PULFREY,
*Examiners.*